US008649996B2

(12) United States Patent
De La Rue et al.

(10) Patent No.: US 8,649,996 B2
(45) Date of Patent: Feb. 11, 2014

(54) CONTAINER CONTROL

(75) Inventors: Michael David De La Rue, Warsaw (PL); Abhinav Singh, Gold Coast (SG); Boby Kj, Kerala (IN); Maciej Gulak, Jozefoslaw (PL); Manuel Nakamurakare, Callao (PE); Marco Aurelio da Costa Soeima, Santo Antonio dos Cavaleiros (PT)

(73) Assignee: Nokia Solutions and Networks Oy, Espoo (FI)

( * ) Notice: Subject to any disclaimer, the term of this patent is extended or adjusted under 35 U.S.C. 154(b) by 281 days.

(21) Appl. No.: 13/151,447

(22) Filed: Jun. 2, 2011

(65) Prior Publication Data

US 2012/0310586 A1    Dec. 6, 2012

(51) Int. Cl.
*G06F 15/00* (2006.01)
*G06F 19/00* (2011.01)
*G08B 1/08* (2006.01)

(52) U.S. Cl.
USPC ................ 702/127; 700/115; 340/539.26

(58) Field of Classification Search
USPC ......... 702/127, 33–35, 81, 84, 130–132, 136, 702/138–140, 182–183, 188–189; 700/9, 700/108–109, 112–113, 115, 213–215, 700/299; 705/22–23, 28; 340/539.1, 340/539.22, 539.26–539.27, 540, 572.1, 340/584–585; 235/384–385; 73/865.8; 62/1, 3.6, 3.61

See application file for complete search history.

(56) References Cited

U.S. PATENT DOCUMENTS

| 6,665,582 B1 | 12/2003 | Moritz et al. |
| 2005/0073406 A1 | 4/2005 | Easley et al. |
| 2006/0012481 A1* | 1/2006 | Rajapakse et al. ......... 340/572.1 |

FOREIGN PATENT DOCUMENTS

| WO | 2006/053566 A1 | 5/2006 |
| WO | 2009/042640 A2 | 4/2009 |

OTHER PUBLICATIONS

International Search Report application No. PCT/EP2012/059380 dated Aug. 1, 2012.

\* cited by examiner

*Primary Examiner* — Toan Le
(74) *Attorney, Agent, or Firm* — Squire Sanders (US) LLP

(57) ABSTRACT

The present invention relates to methods and apparatus for controlling environmental systems in containers. A first set of environmental conditions for a first product to be stored in a container is received and it is determined if the first set of environmental conditions are compatible with a second set of environmental conditions for one or more second products in the container. An acceptable set of environmental conditions for both first and second products based on the first set of environmental conditions and the second set of environmental conditions is determined and the acceptable set of environmental conditions are stored.

7 Claims, 2 Drawing Sheets

CONTAINER CONTROL

BACKGROUND

1. Field of the Invention

The present invention relates to container control and, in particular, to controlling environmental conditions in a container.

2. Description of the Related Art

Presently, many different products and goods are transported around local areas, countrywide, and worldwide in order to deliver the products and goods to various locations, e.g. stores, shops, companies, etc.

Typically, products and goods are transported in containers, either on land vehicles, such as trucks or lorries, or by sea vehicles, such as ships. There are a vast and substantial range of products and goods that may be transported in this manner, ranging from fresh products, such as food produce, to electrical and mechanical goods. Each of the products and goods will require different environmental conditions in order to keep the products and goods in good condition and so many containers include one or more of environmental systems, such as cooling systems, heating systems, humidity systems, filter systems, and so on.

Containers are also typically used as and when available and so may be used to transport a wide range of products and goods. Thus, the containers environmental systems will typically be set, erring on the side of caution, to maintain the environment in the container closer to an extreme which is inefficient, may damage some products or goods transported in the container, can waste energy and therefore be more expensive to operate. For example, the most frequent type of environmental system in a container is a cooling system and so the container may be kept at a low temperature, erring on the side of caution, which often will result in unnecessary cooling, or even not enough cooling, which is inefficient, costly to run and may damage products or goods being transported in the container.

Also, a single container may be transporting two or more products or goods and so by arbitrarily setting the environmental systems in the container may mean one product or goods being damaged as the environmental systems setting may not be suitable for all of the two or more products or goods sharing the same container.

Accordingly, current transportation means are inefficient, costly and may damage products or goods being transported in containers. As such, the present invention seeks to address, at least in part, any or all of the above described problems, drawbacks and disadvantages described above.

BRIEF SUMMARY OF THE INVENTION

According to a first aspect of the present invention there is provided a method comprising the steps of: receiving a first set of environmental conditions for a first product, wherein said first product is to be stored in a container; determining if said first set of environmental conditions are compatible with a second set of environmental conditions for one or more second products in said container; determining an acceptable set of environmental conditions for both first and second products based on said first set of environmental conditions and said second set of environmental conditions; and storing said acceptable set of environmental conditions.

The method may be implemented on an environmental system, a warehouse system, a mobile device, or the functionality split therebetween. The environmental conditions of a product to be stored in a container are compared with the environmental conditions of the products already stored in the container and an acceptable set of environmental conditions are determined.

The method may further comprise the steps of identifying that no further products are to be stored in said container; and setting said acceptable set of environmental conditions in an environmental system in said container. Thus, once all products are stored in the container then the environmental system is set with the acceptable environmental conditions for all of the products.

The method may further comprise the steps of determining if said first set of environmental conditions are not compatible with said second set of environmental conditions for one or more second products in said container; and triggering an alert that said first product is not compatible with said one or more second products. Therefore, if it is determined those products are incompatible then an alert is raised to prevent the incompatible products being stored together which mat damage one or more of the products.

The method may further comprise the steps of receiving a status update for said environmental system in said container; and triggering an action based on said status update. Therefore, if the environmental system develops a fault then an action, e.g. a corrective action, may be triggered such as ordering a new container, requesting an engineer, and so on.

According to a second aspect of the present invention there is provided an apparatus comprising: a first input adapted to receive a first set of environmental conditions for a first product, wherein said first product is to be stored in a container; a first processor adapted to determine if said first set of environmental conditions are compatible with a second set of environmental conditions for one or more second products in said container; a second processor adapted to determine an acceptable set of environmental conditions for both first and second products based on said first set of environmental conditions and said second set of environmental conditions; and a memory adapted to store said acceptable set of environmental conditions.

According to a third aspect of the present invention there is provided an apparatus adapted to: receive a first set of environmental conditions for a first product, wherein said first product is to be stored in a container; determine if said first set of environmental conditions are compatible with a second set of environmental conditions for one or more second products in said container; determine an acceptable set of environmental conditions for both first and second products based on said first set of environmental conditions and said second set of environmental conditions; and store said acceptable set of environmental conditions.

The apparatus may be adapted using hardware, software or any combination thereof. The processors may interact with inputs, outputs, memory and so on so as to be adapted to determine.

The apparatus may further comprise a third processor adapted to identify that no further products are to be stored in said container; and a fourth processor adapted to set said acceptable set of environmental conditions in an environmental system in said container.

The apparatus may further comprise a fifth processor adapted to determine if said first set of environmental conditions are not compatible with said second set of environmental conditions for one or more second products in said container; and a sixth processor adapted to trigger an alert that said first product is not compatible with said one or more second products.

The apparatus may further comprise a second input adapted to receive a status update for said environmental system in said container; and a seventh processor adapted to trigger an action based on said status update.

The first processor through seventh processor may be the same processor, different processors or any combination thereof. The first input and the second input may be the same input or different inputs.

The apparatus may be a server, an environmental system or a mobile device. The apparatus may be adapted by any means in order to implement the functionality of the aspects of the present invention.

According to a fourth aspect of the present invention there is provided a computer program product comprising computer readable executable code for: receiving a first set of environmental conditions for a first product, wherein said first product is to be stored in a container; determining if said first set of environmental conditions are compatible with a second set of environmental conditions for one or more second products in said container; determining an acceptable set of environmental conditions for both first and second products based on said first set of environmental conditions and said second set of environmental conditions; and storing said acceptable set of environmental conditions.

The computer program product may further comprise computer readable executable code for performing any or all of the functions in accordance with the aspects of the invention.

BRIEF DESCRIPTION OF THE SEVERAL VIEWS OF THE DRAWINGS

Embodiments of the present invention will now be described, by way of example only, and with reference to the accompanying drawings, in which.

DETAILED DESCRIPTION OF THE INVENTION

Figure 1:
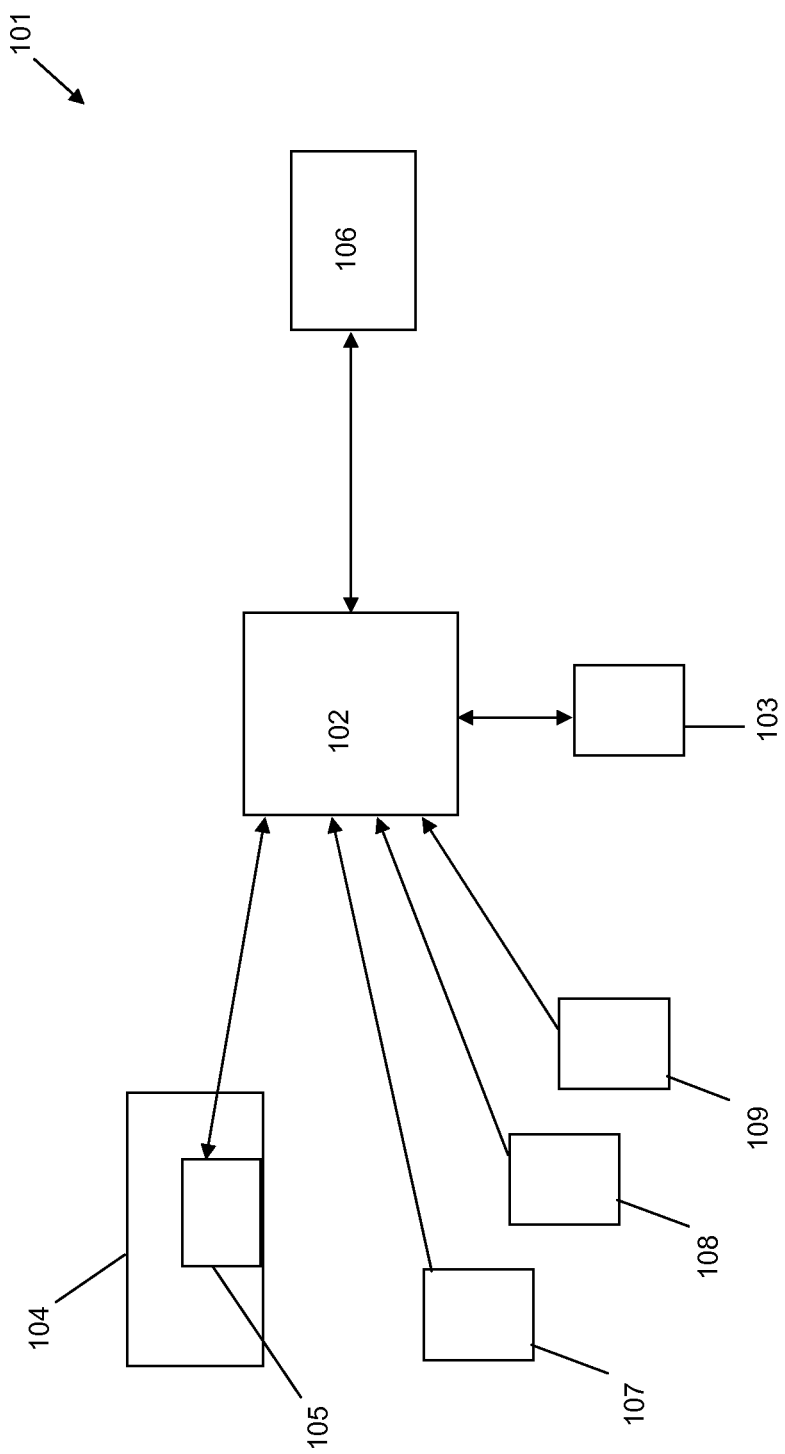
FIG. 1 shows a simplified block diagram of a system according to many embodiments of the present invention.

With reference to FIG. 1, a system 101 according to many of the embodiments is shown in which an application 102 is operatively connected to one or more of an input device 103, an environmental system 105 in a container 104 and a warehouse system 106.

A number of products or goods 107, 108, 109 may be transported in the container 104 where each of the products or goods 107, 108, 109 may require different environmental conditions. As will be appreciated the environmental system 105 may be any environmental system or combination of environmental systems, e.g. a cooling system, a heating system, humidity system, air systems, filter systems, and so on. However, for the ease of describing the embodiments of the present invention the environmental system 105 will be a cooling system.

The application 102 may be on a computing device, for example a server, or may be an application 102 embedded or integral with the environmental system 105 on the container 104, or may be an application 102 embedded or integral with a warehouse (or similar store or stock area) system 106. The functionality of the application 102 may also be split between two or more entities, for example, it may be split between an application on an environmental system and an application on a warehouse system.

In this example, in order to provide a simplified explanation there are three products 107, 108, 109 that are ready to be transported to another location. However, as will be appreciated any number of products or goods may be at the warehouse or store to load into containers for transportation.

On loading a container 104 with a product 107, 108, 109 the application 102 receives parameters relating to the product 107. Based on the received parameters the application 102 may determine the environmental conditions relating to the product 107, 108, 109.

For example, the parameters may include an identification of the product 107, 108, 109 and the application 102 may identify the environmental conditions for the product 107, 108, 109 from a database that is integral with the application 102 or operatively connected thereto. The parameters in this case may identify the product 107, 108, 109 and the application 102 may interrogate the database in order to identify the associated environmental conditions for the product 107, 108, 109.

Alternatively, the parameters received by the application 102 for the product 107, 108, 109 may include the relevant environmental conditions for the product 107, 108, 109.

The parameters for each product 107, 108, 109 may be received by the application 102 via an input device 103.

For example, the input device 103 may be a barcode reader where the barcode for each product, or type of product, may be read by the barcode reader in order to obtain the parameters relating to the product 107, 108, 109. The barcode on the products 107, 108, 109 may include parameters that identify the product 107, 108, 109 enabling the application 102 to retrieve the environmental conditions from the database, or the barcode may include or be encoded with parameters that directly indicate or identify the environmental conditions for the product 107, 108, 109. The barcode reader may be attached to the container 104 or attached to the warehouse systems 106, as long as the application 102 can identify, determine or receive the environmental conditions for the product 107, 108, 109.

The input device 103 may be a Near Field Communication (NFC) device where the products 107, 108, 109 include an NFC tag. Similar to the barcode example, the NFC tag may include parameters that identify the product 107, 108, 109 enabling the application 102 to obtain the environmental conditions for the product 107, 108, 109 from a database, or the NFC tag on the product 107, 108, 109 may include or be encoded with parameters that directly indicate the environmental conditions for the product 107, 108, 109. The NFC device may be attached to the container, a human loading the product 107, 108, 109 into the container, attached to vehicles or apparatus used to load the products 107, 108, 109 into the container, and so on.

As will be appreciated, the input device 103 may be any device that enables parameters relating to a product 107, 108, 109 to be received by the application 102.

When a product 107, 108, 109 is to be loaded into a container 104 the environmental conditions for the product 107, 108, 109 are determined or identified by the application 102.

The application 102 may be aware of the details if the environmental system 105 in the container 104 if the application 102 is part of the environmental system 105. The application 102 may receive, for example, via a wireless connection, an identification of the environmental system 105 if the application 102 is separate to the environmental system 105 so that the application 102 may retrieve details of the environmental system 105 from a database. The application 102 may receive the details of the environmental system 105 directly from the environmental system 105 for example, via a wireless connection. The details of the environmental system 105 may include, for example, the operating range, abilities, and so on.

If the product 107, 108, 109 loaded into the container 104 is the first product to be loaded into the container 104 then the application 102 stores or identifies the environmental conditions for the product 107, 108, 109.

If the product 107, 108, 109 being loaded into the container is a further product, e.g. not the first product, then the application 102 identifies the environmental conditions for the further product 107, 108, 109 and identifies that the further product 107, 108, 109 is not the first product in the container 104. The application 104 compares the environmental conditions for the further product 107, 108, 109 with the environmental conditions of the product(s) 107, 108, 109 inside the container 104. The application 102 may determine, based on the comparison, whether the environmental conditions for the further product 107, 108, 109 are compatible with the products in the container.

If the application 102 determines that the environmental conditions are incompatible with each other, or with the abilities of the environmental system 105 in the container 104, then the application 102 may raise or provide an alarm or alert to indicate that the further product should not be loaded in the container 104.

The alert or alarm may be audible, visual (e.g. a message, a flashing light), and so on.

If the application 102 determines that the environmental conditions are compatible then the application 102 may determine the ranges that the environmental system 105 in the container 104 will be set at to be acceptable for all products.

This process continues until all products 107, 108, 109 have been loaded into the container 104 or indicated as incompatible. At this time, the application 102 may operatively communicate with the environmental system 105 in the container 104 in order to set the determined environmental ranges that the environmental system 105 is to operate at whilst the products 107, 108, 109 in the container 104 are transported.

For example, if the application 102 is implemented as part of the warehouse or store area systems 106 then the application 102 may transmit the environmental ranges to the environmental system 105 on the container 104. The application may transmit the environmental ranges to the environmental system 105 via any wireless communication channels, wired communication channels, or any combination thereof.

If the application 102 is implemented as part of, or integral with, the environmental system 105 on the container 104 then the application 102 can set internally with the environmental system 105 the determined environmental ranges for the products 107, 108, 109 loaded into the container 104.

Figure 2:
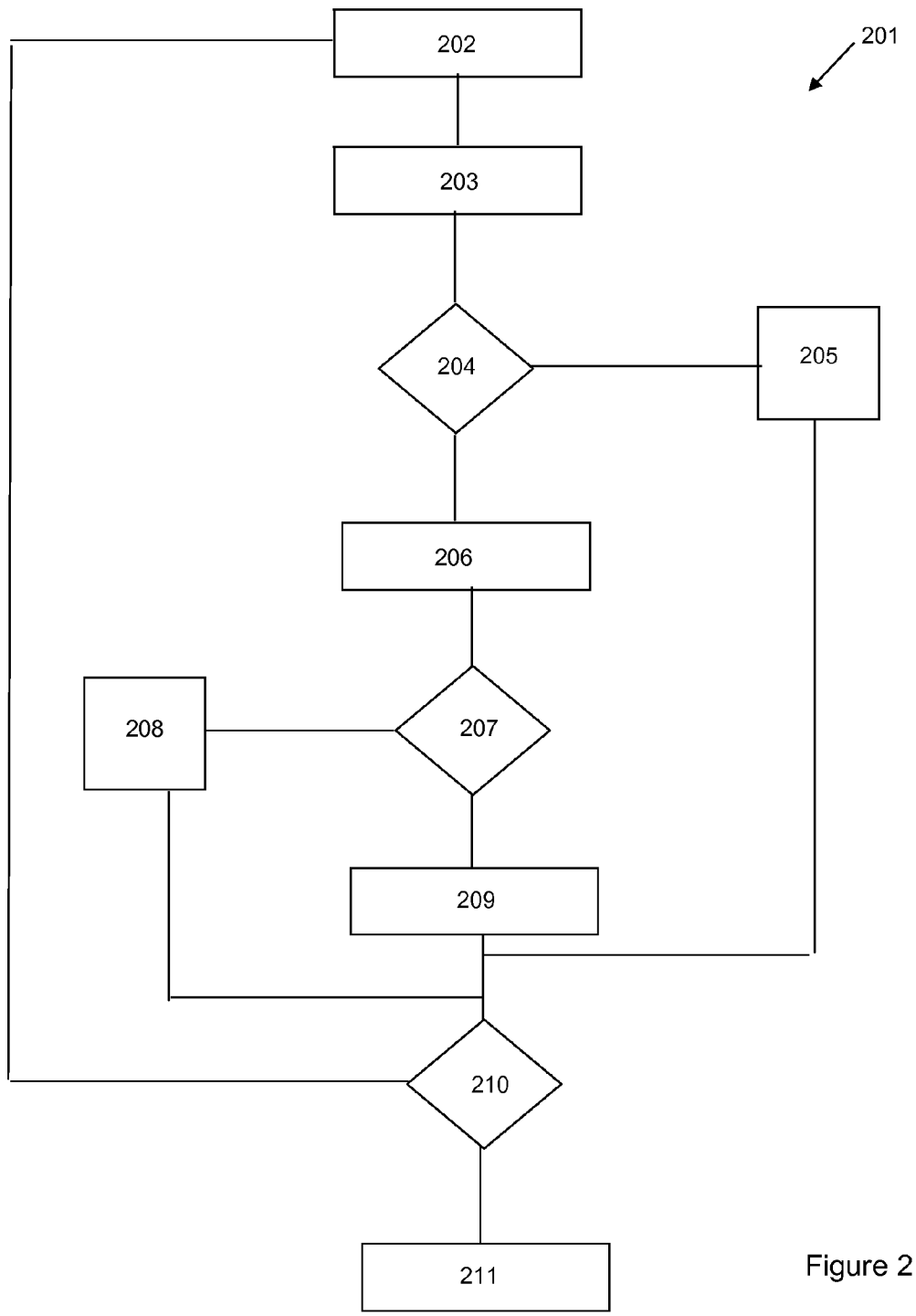
FIG. 2 shows a flow diagram in accordance with many embodiments of the present invention.

An example will now be described with reference to FIG. 2 which shows a simplified flow chart 201 in accordance with many of the embodiments of the present invention.

In this example, three products will be attempted to load into a container, where the container includes a cooling system (e.g. the environmental system). The first product, Product A, has a cooling requirement or temperature range of $2°$ C. to $5°$ C. The second product, Product B, has a cooling requirement or temperature range of $-2°$ C. to $1°$ C. The third product, Product C, has a cooling requirement or temperature range of $3°$ C. to $7°$ C.

In this example, the application 102 is implemented on a computing device at the warehouse from which the products are to be loaded onto a container. Also, in this example, the products comprise a barcode that is encoded with the environmental conditions, e.g. the cooling requirement or temperature range of the product and the person loading the products into the container has a barcode reader that is in communication with the application. The application in this example is also aware of the capabilities of the cooling system on the container and may communicate with the cooling system via wireless communication channels, e.g. Bluetooth.

Product A is selected to be loaded into the container 202. The person that will be loading Product A into the container utilises a barcode reader to read the barcode attached to Product A and receive the environmental conditions for Product A which are transmitted to, or received by, the application 203.

The application determines whether Product A is the first product to be loaded into the container 204. In this case, the determination will be "Yes" and the application will store or maintain a record of the environmental conditions determined at that time to be set for the environmental system 205.

The application then checks to see if Product A is the last product to be loaded into the container 210. In this example, the person loading the container will indicate to the application when the last product has been loaded by providing an input, e.g. selecting the option on a computing device, reading a barcode that indicates the container has been loaded, and so on. However, as both Product B and Product C are to be loaded into the container then the process returns to 202.

Product B is now selected to be loaded into the container 202. The barcode reader reads the barcode associated with Product B to receive or obtain the environmental conditions for Product B that are encoded in the barcode and the environmental conditions for Product B are transmitted to, or received by, the application 203.

As Product B is the second product to be loaded into the container then the application determines that Product B is not the first product to be loaded in 204. The application compares 206 the environmental conditions of Product B with the currently stored environmental ranges that will be used to set the environmental system. In this case only Product A has been considered and so the currently stored environmental ranges correspond to the environmental conditions of Product A. Thus, in this example the application will compare the currently stored (e.g. Product A's) temperature range of $2°$ C. to $5°$ C. with Product B's temperature range of $-2°$ C. to $1°$ C.

The application will determine 207 whether Product B is compatible with the products already loaded into the container based on the above comparison. In this example, the temperature range for Product B will be determined as not compatible with the currently stored temperature range (e.g. that for Product A). Thus, the application will provide an audible alarm 208 to indicate that Product B is not compatible with the products currently loaded into the container so that the person loading the container is made aware of the incompatibility and prevent Product B being loaded into the container.

The process returns to step 202 as Product B was not the last product to be loaded and Product C is selected to be loaded for transportation. The barcode reader reads the barcode associated with Product C to receive or obtain the environmental conditions for Product C that are encoded in the barcode and the environmental conditions for Product C are transmitted to, or received by, the application 203.

As Product C is the third product to be loaded into the container then the application determines that Product C is not the first product to be loaded in 204. The application compares 206 the environmental conditions of Product C with the currently stored and determined environmental ranges to which the environmental system is to be set. Thus, in this example the application will compare the currently stored (e.g. Product A's) temperature range of $2°$ C. to $5°$ C. with Product C's temperature range of $3°$ C. to $8°$ C.

The application will determine 207 whether Product C is compatible with the products currently loaded into the container based on the above comparison. In this example, the temperature range for Product C will be determined as compatible with the currently stored temperature range for the container as the temperature range for Product C has an overlapping portion with the currently stored temperature range for the container.

The application, based on the comparison, determines 209 an allowable or acceptable temperature range between Product C and the currently stored temperature range for the container (e.g. Product A). In this example, the temperature range of 3° C. to 5° C. is acceptable to both Product C and the products already loaded into the container. Therefore, the application stores 205 the current determined temperature range to be set in the environmental system as 3° C. to 5° C. so that any further products environmental conditions can be compared with the current determined and stored environmental ranges that will be set in the environmental system of the container.

In this example, Product C is the last product to be loaded, or considered for loading, and therefore the person loading the container provides an indication that the container is fully loaded, by for example selecting an option, pressing a button, and so on. Accordingly, the application determines 210 that the last product has been loaded into the container.

The application then operatively communicates 211 with the environmental system in the container to set the environmental ranges determined by the application such that the environmental system will now operate at the set environmental range, which in this example, is 3° C. to 5° C.

Returning to FIG. 1, the application 102 may further receive updates from the environmental system 105 in the container 104 as the container 104 is being transported. The updates may be received from the environmental system 105 via wireless communication channels if the application 102 is not part of or integral with the environmental system 105. If the application 102 is part of the environmental system 105 on the container 104 then the application 102 will receive the updates directly from the environmental system 105. The updates may relate to or be associated with different aspects of the environmental system 105. For example, the updates may provide the application 102 with a status report of the environmental system 105. The application 102 may determine based on the status report whether the environmental system 105 is still able to provide the necessary environmental conditions in the container 104.

If the application 102 determines that a fault has occurred with the environmental system 105 it may trigger one or more corrective actions such as transmit an alert to the container owner, request a new container, inform the driver, divert the container to a suitable warehouse, and so on, so the fault may be rectified.

In many of the embodiments the container is a transportable container, e.g. by truck or by ship. However, as will be appreciated the container may be any container that may store products such as a refrigerator unit, a shop, a warehouse, and so on, where those locations have an environmental system for storing products.

While preferred embodiments of the invention have been shown and described, it will be understood that such embodiments are described by way of example only. Numerous variations, changes and substitutions will occur to those skilled in the art without departing from the scope of the present invention as defined by the appended claims. Accordingly, it is intended that the following claims cover all such variations or equivalents as fall within the spirit and the scope of the invention.

We claim:

1. A method, comprising:
receiving a first set of environmental conditions for a first product, wherein said first product is to be stored in a container;
determining, via a computing device, if said first set of environmental conditions are compatible with a second set of environmental conditions for one or more second products in said container;
when said first set of environmental conditions are compatible with said second set of environmental conditions for one or more second products in said container:
determining, via the computing device, an acceptable set of environmental conditions for both first and second products based on said first set of environmental conditions and said second set of environmental conditions;
storing, via the computing device, said acceptable set of environmental conditions;
identifying that no further products are to be stored in said container; and
setting said acceptable set of environment conditions in an environmental system in said container;
when said first set of environmental conditions are not compatible with said second set of environmental conditions for said one or more second products in said container:
triggering an alert that said first product is not compatible with said one or more second products.

2. The method as claimed in claim 1, further comprising:
receiving a status update for said environmental system in said container; and
triggering an action based on said status update.

3. The method as claimed in claim 1,
wherein said determining when said first set of environmental conditions are compatible with said second set of environmental conditions for said one or more second products in said container further comprises determining said environmental conditions of said first product; and
wherein said environmental conditions of said first product are determined, when said first product is to be loaded into said container.

4. An apparatus, comprising:
a first input adapted to receive a first set of environmental conditions for a first product, wherein said first product is to be stored in a container;
a first processor adapted to determine if said first set of environmental conditions are compatible with a second set of environmental conditions for one or more second products in said container;
a second processor adapted to determine an acceptable set of environmental conditions for both first and second products based on said first set of environmental conditions and said second set of environmental conditions, when said first set of environmental conditions are compatible with said second set of environmental conditions for one or more second products in said container; and
a memory adapted to store said acceptable set of environmental conditions, when said first set of environmental conditions are compatible with said second set of environmental conditions for one or more second products in said container;
a third processor adapted to identify that no further products are to be stored in said container, when said first set of environmental conditions are compatible with said second set of environmental conditions for one or more second products in said container;

a fourth processor adapted to set said acceptable set of environmental conditions in an environmental system in said container, when said first set of environmental conditions are compatible with said second set of environmental conditions for one or more second products in said container; and a sixth processor adapted to trigger an alert that said first product is not compatible with said one or more second products, when said first set of environmental conditions are not compatible with said second set of environmental conditions for one or more second products in said container.

5. The apparatus as claimed in claim 4, further comprising:

a second input adapted to receive a status update for said environmental system in said container; and a seventh processor adapted to trigger an action based on said status update.

6. The apparatus as claimed in claim 4, further comprising:

a barcode reader adapted to read a barcode attached to said first product; and an eighth processor adapted to determine said first set of environmental conditions based on said barcode, said barcode including parameter or being encoded with parameters that directly indicate or identify said first set of environmental conditions for said first product.

7. A computer program product, embodied in a non-transitory computer readable medium, comprising computer readable executable code for controlling a processor to perform the steps of:

receiving a first set of environmental conditions for a first product, wherein said first product is to be stored in a container;

determining if said first set of environmental conditions are compatible with a second set of environmental conditions for one or more second products in said container;

when said first set of environmental conditions are compatible with said second set of environmental conditions for one or more second products in said container:

determining an acceptable set of environmental conditions for both first and second products based on said first set of environmental conditions and said second set of environmental conditions;

storing said acceptable set of environmental conditions;

identifying that no further products are to be stored in said container; and setting said acceptable set of environmental conditions in an environmental system in said container;

when said first set of environmental conditions are not compatible with said second set of environmental conditions for said one or more second products in said container:

triggering an alert that said first product is not compatible with said one or more second products.

* * * * *